May 17, 1955 AN WANG 2,708,722

PULSE TRANSFER CONTROLLING DEVICES

Filed Oct. 21, 1949 3 Sheets-Sheet 1

INVENTOR.
AN WANG

BY

Edgar H. Kent
ATTORNEY

May 17, 1955 AN WANG 2,708,722

PULSE TRANSFER CONTROLLING DEVICES

Filed Oct. 21, 1949 3 Sheets-Sheet 2

INVENTOR.
AN WANG
BY
Edgar H. Kent
ATTORNEY

INVENTOR.
AN WANG
BY
Edgar H. Kent
ATTORNEY 2,708,722

PULSE TRANSFER CONTROLLING DEVICE

An Wang, Cambridge, Mass.

Application October 21, 1949, Serial No. 122,769
34 Claims. (Cl. 307—88)

This invention relates to pulse transfer controlling devices and more particularly to a static magnetic device for controlling the transfer of pulses to effect storage of information corresponding to such pulses and switching of pulses.

As a switching device, the static magnetic device of my invention may be used to control the transfer of pulses from a source to a load. It is able to operate at high speed, as it is not subject to mechanical limitations, an advantage over relays and the like.

As a storage device the static magnetic pulse transfer controlling device of my invention has numerous advantages over other storage devices now in use. Once the information corresponding to a pulse has been stored, no power is needed to preserve it; an improvement over cathode ray tube, relay, acoustic and vacuum tube storage systems. Further the magnetic device of my invention involves no mechanical movement, in contrast to rotating drums, magnetic tape, and magnetic wire, and hence, its speed is not limited by mechanical considerations. Since the speed of advance of information in an information delay system constructed in accordance with my invention can be easily and swiftly varied, the system is especially useful as a link between systems operating at different speeds. For example, in a computing machine, numbers or control commands can be put into the information delay line manually, and then read into the machine at its operating speed. Results from the machine may be fed at high speed into another information delay line, from which they may later be read out at a speed suitable, say, for the operation of a typewriter.

In a similar way, the information delay line may serve as terminal storage for a high speed telegraphy system between high speed telegraphic lines and typewriters.

Such an information delay line is also useful in telephone systems, for instance in automatic dial systems and the like, which require storage of activating pulses for short intervals of time.

The information delay line of my invention may also be used as a counter by registering a pulse at the beginning of the information delay line, and by locating the information corresponding to this pulse at a later instant to determine the number of pulses that have been counted.

For the purpose of further explaining my invention, reference is made to the following drawings, in which, Fig. 1 is a hysteresis curve of magnetic material such as is used in the device.

The other figures are circuit diagrams, in which.

Figures 1, 2, 3:
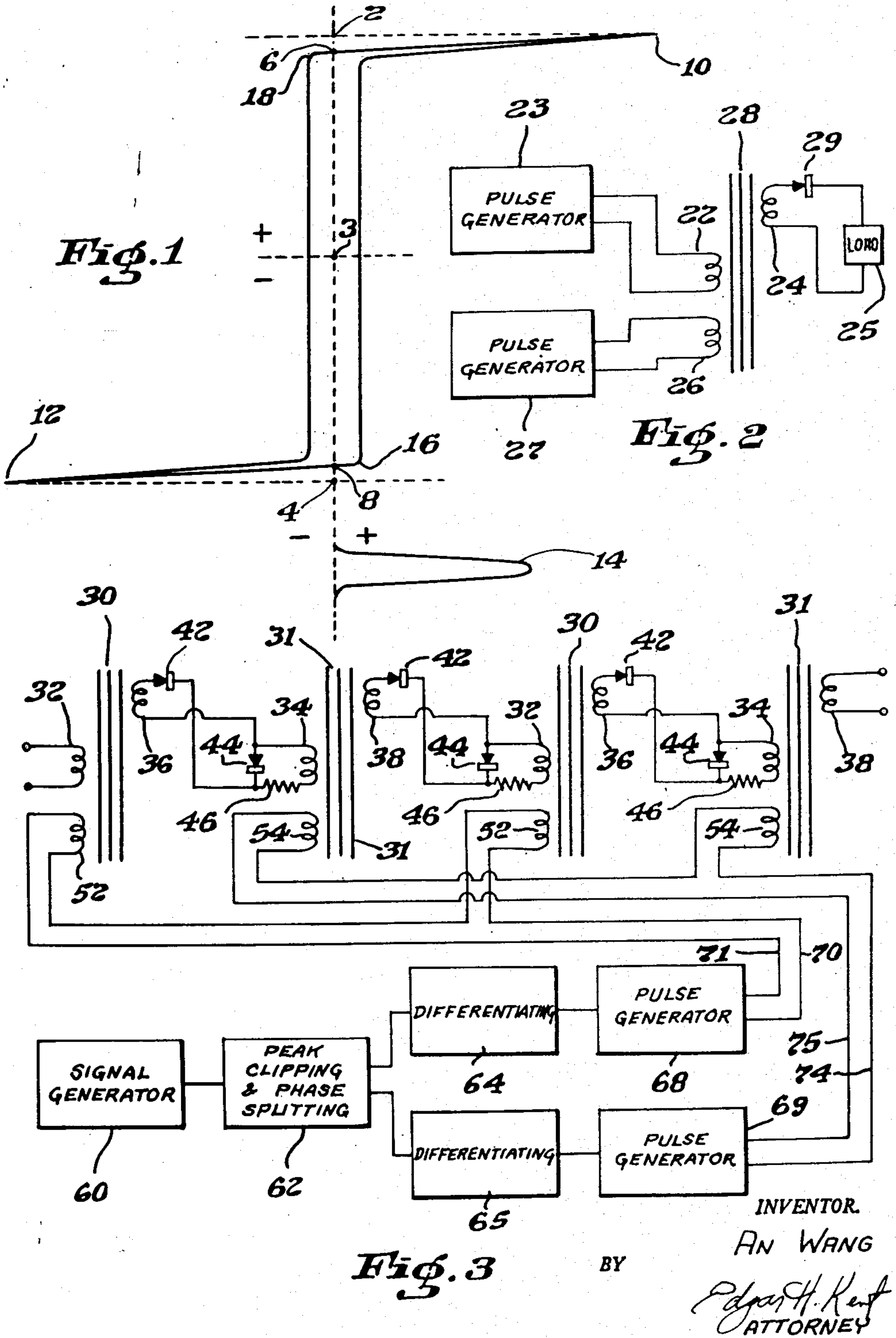
Fig. 2 illustrates the magnetic pulse transfer controlling device of my invention.
Fig. 3 illustrates the information delay line of my invention.

Referring to Fig. 1, the hysteresis characteristic of the magnetic material used in my invention should be such that the residual magnetic flux density (B*r*), shown by the distance between points 3 and 6, and 3 and 8, is a large fraction of the saturation flux density (B*s*), shown by the distance between points 3 and 2, and 3 and 4, at least 0.4–0.5, preferably greater than 0.80, and in general as large as possible. If the ratio $Br/Bs$, where B*r* is the residual magnetic flux density and B*s* the saturation flux density, is too small, the operation of the static magnetic pulse transfer controlling device of my invention will be unreliable and even inoperative. I prefer also that the knees 16 and 18 of the hysteresis curve be as square as possible. A magnetic material such as "Deltamax," manufactured by the Allegheny-Ludlum Steel Corporation, is satisfactory, such material being a specially treated nickel iron alloy in which the ratio $Br/Bs$ is approximately 0.90 and the hysteresis curve is substantially as shown in Fig. 1.

Such a magnetic material has two states of equilibrium, the point 6 which represents positive residual magnetic flux density, and the point 8 which represents negative residual magnetic flux density.

Referring to Fig. 2 the transfer of pulses from an input winding 22 on such a core 28 to an output winding 24 on the core may be controlled by setting the core at a state of residual magnetic flux density which will either allow or prevent the transfer.

Assuming the core at a negative state of residual magnetism, if a negative pulse is applied to a winding on such a core, there will be little or no flux change in the core. Hence the winding will appear as a short circuit and no power will be transferred through the core.

If the same pulse is applied to the core at a positive state of residual magnetism a large flux change will occur. The winding will then have a comparatively high impedance and power will be transferred through the core.

If there are other windings on the core, any change in flux will induce a voltage across such windings; thus if the change of flux was a large one, a large voltage will be induced in such windings, and if the change of flux was a small one, a small or negligible voltage will be induced in such windings. It will thus be seen that if the state of flux of the core can be controlled, the transfer of a pulse through the core can be controlled.

The polarity of the residual magnetism of the core may be controlled to a desired state by applying a pulse 14, illustrated for instance as a positive pulse in Fig. 1, by means of control winding 26 on a core 28 of such magnetic material, as shown in Fig. 2, or it may be applied by the input or output windings by using a suitable switching arrangement. Such a control pulse may be supplied by a pulse generator, indicated generally at 27, such pulse generators being well known in the art.

Assuming the core to be in a state of positive residual magnetic flux density, as shown by point 6, a negative information pulse supplied by pulse generator 23 will be transferred from an input winding 22 to an output winding 24 and load 25 due to voltage induced in said output winding by the large flux change. The core is then in a negative state of residual magnetism and may be returned to the positive state in readiness for a following negative pulse. This may be done by applying a positive pulse 14 to the core, for instance, by winding 26 connected to pulse generator 27. Thus the transfer of a pulse through the core may be controlled by the state of residual magnetism of such a core. Since the positive control pulse will induce voltage pulses in input and output windings of opposite polarity from that of the negative power input pulse, if the device is to be used as a switch a unidirectional current device such as a rectifier 29 may be inserted in series relation with output winding 24 and load 25 to prevent the flow of current through the load 25 when a positive control pulse is applied to winding 26. The positive control pulse, then, need only change the flux of the core, as the rectifier 29 will prevent any dissipation of power in the load 25, and hence such a control pulse need supply very little power. Thus a small pulse may be used to control a much larger power pulse to provide a power gain.

If it is desired to prevent the passage of the negative pulses from input winding 22 to output winding 24 through the core 28, the application of one negative pulse by pulse generator 27 to control winding 26 will put the core 28 in the negative state of residual magnetism in which only very small flux changes will occur when the negative power input pulse is applied to winding 22; or by simply removing the source of positive pulses from the control winding, the core will be put in the negative state of residual magnetic flux density by the following negative pulse from pulse generator 27 and will remain there, thus blocking the further transfer of power through the core.

Obviously, positive power pulses may be similarly controlled by reversing the polarity of the control pulses and the unilateral current device.

Such a device is useful in many ways, for instance a number of such cores with power input windings in series relation will permit the switching of a power pulse to a number of loads across the output windings of the cores, such switching being controlled by the application of a control pulse to the control winding of each core.

The pulse transfer controlling device of my invention may also be used for the storage of information in binary form by using the state of flux of the core as a storage medium for the information, and at a later time applying a pulse to the input winding to transfer the information out of the core by the switching function of the state of residual magnetism of the core. For instance, if a positive control pulse is applied to the control winding 26, the core 28 assumes the state of positive residual magnetic flux density as hereinbefore explained. Information corresponding to the state of residual magnetism of the core may be transferred to the output winding by means of a subsequent negative input pulse applied to input winding 22. Since there is no requirement of time involved in the application of the negative input pulse, the information corresponding to the positive state of residual magnetism will be transferred from the core 28 to the output winding 24 and load 25 at any time in the future.

The information input to the control winding 26 may take two forms, a positive pulse or no pulse, which, for instance, may be used to represent the digits 1 and 0 in the binary number system. The application of a negative pulse to the input winding 22 will then in effect transfer this information out of the core. Assuming the core is originally in a state of negative residual magnetic flux density, the application of a positive pulse representing the digit 1 in the binary system to the control winding 26 will cause the magnetic material to assume the positive state of residual magnetic flux density. The application of the negative input pulse to winding 22 will then cause the magnetic material to assume the negative state again, and a large voltage will be induced in the output winding. If no pulse, representing the digit 0 in the binary system, is applied to the control winding, the application of the negative input pulse will cause no flux change and a small or negligible voltage will be induced in the output windings. Thus information in the form of a positive or negative state of flux of the magnetic material may be stored in a core 28 and read out at a future time.

To avoid actuating the load 25 by the input pulse as well as the control pulse, a unilateral current device such as rectifier 29 may be inserted to prevent passage of the current induced by the control pulse to the load 25 as hereinbefore explained. Such a device will not prevent passage of current due to the input pulse, since the voltage induced in the output winding by the input and control pulses will be of opposite polarity.

Instead of destroying the information stored in the device of Fig. 2, it may be transferred to a second core. By using a series of such cores, it is possible to transfer the information step by step down the series of cores, thus giving an information delay line.

Referring to Fig. 3, cores 30 and 31 of magnetic material with control windings 32 and 34, output windings 36 and 38, and input or advancing windings 52 and 54, all as hereinbefore described, are interconnected by connecting the output windings 36 of cores 30 to the control windings 34 of the cores 31 through rectifiers 42, and shunting the control windings 32 and 34 by rectifiers 44. The number of turns used in the output windings of said cores must be great enough to operate the control windings on following cores and prevent attenuation of the information. I prefer that the change of flux linkage of such an output coil be equal to or slightly greater than the change of flux linkage of the following control winding. Current limiting resistors 46 may be used if desired. Negative pulses alternate in time may be applied to advancing windings 52 and 54 through wires 70 and 71, and 74 and 75 respectively, said pulses being generated by means of a signal generator 60, a peak clipping and phase splitting circuit 62, differentiating circuits 64 and 65, and pulse forming and amplifying circuits 68 and 69, all well known in the art.

Information may be supplied to the first core 30 by control winding 32, as hereinbefore described. Since applying a current pulse of proper polarity to control winding 32 will induce a voltage in output winding 36 as well as supply the information to the first core 30, rectifier 42 is provided to prevent such voltage from being applied to the control winding 34 of the second core 31. When it is desired to transfer the stored information from the first core 30 to the second core 31, a negative pulse is applied to advancing winding 52. This induces a voltage dependent on the nature of information stored, as hereinbefore described, in output winding 36, that is, a large voltage or a very small voltage. The large voltage will be of such polarity as is not opposed by rectifiers 42 or short circuited by rectifiers 44 and a similar voltage thus appears across control winding 34, changing the flux core 31. The small voltage will not change the flux of core 31. To transfer the stored information from the second core to a third core, a pulse is applied to advancing windings 54. This induces a voltage in output windings 38 and sets the third core at a state of residual magnetism corresponding to said voltage, as hereinbefore described. Since the application of a pulse to cores 30 or 31 changes the flux to the negative state, information corresponding to a negative state of flux will in effect be transferred as well as that corresponding to a positive state of flux. Since voltage will be induced in control windings 34 as well as in output windings 38, rectifiers 44 in parallel with the control windings are provided to prevent inducing a voltage in output windings 36 of cores 30, thus preventing the return of information to the first core. It will be seen that the information will be transferred only to the first following core by applying pulses alternately to cores 30 and 31, and there will be no appreciable backward flowing of the information.

An information delay line may thus be constructed of any number of cores interconnected as shown, and the information in the cores may be advanced by applying input or advancing pulses to alternate cores as shown in Fig. 3. The two advancing pulses can be applied at any rate, or at random, the only requirement being that there is no overlapping of such pulses.

If desired, the output of the delay line may be fed into the input end of the delay line. Thus the information stored in the delay line can be circulated within itself by continuing application of the advancing pulses.

Figures 4, 5:
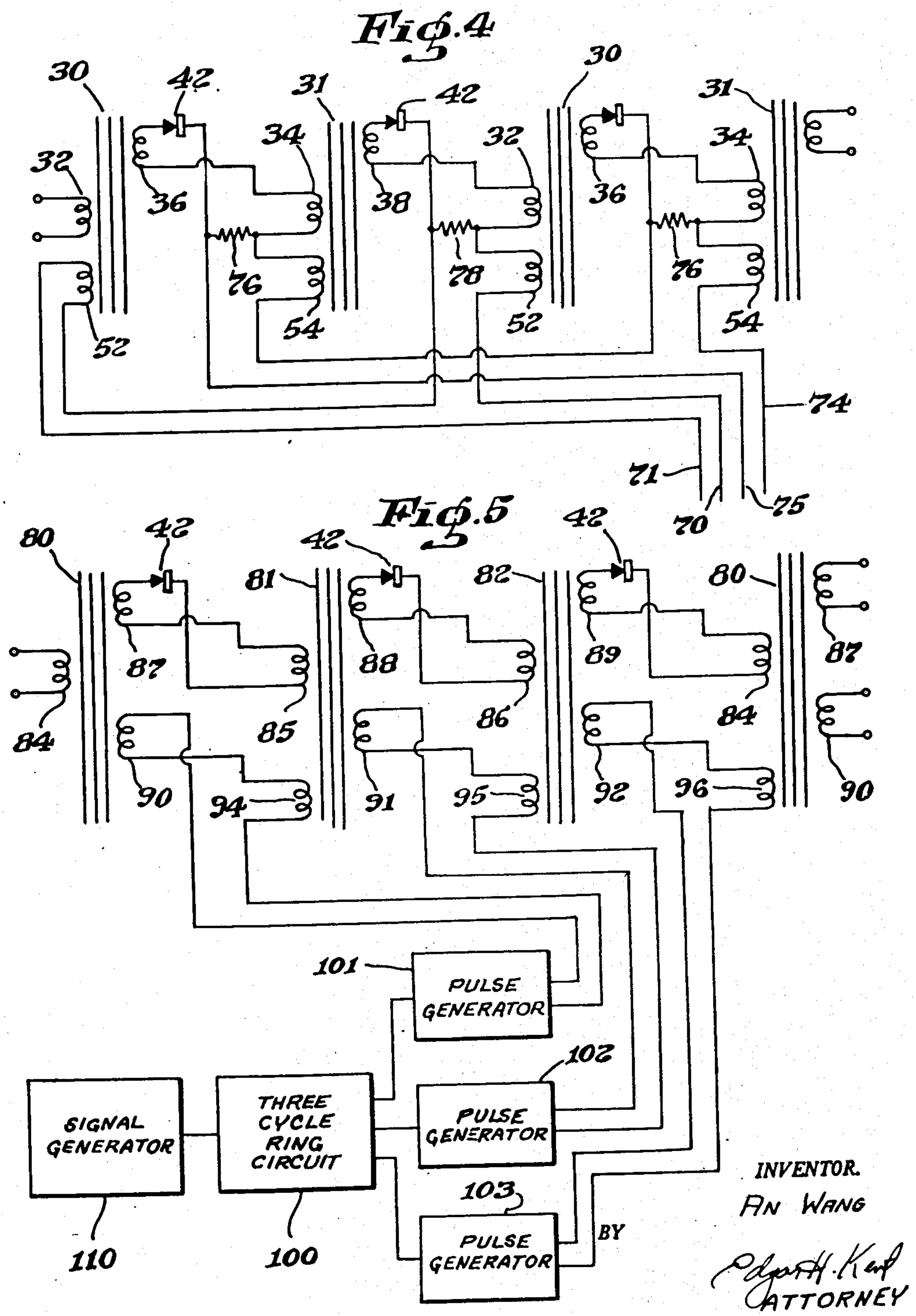
Fig. 4 illustrates a further form of the information delay line.
Fig. 5 illustrates still another form of the information delay line.

Referring to Fig. 4, a further construction of the delay line is shown. In this arrangement, a compensating voltage supplied by resistor 76 in series with control winding 34 and advancing winding 54 is applied to control windings 34 when an advancing pulse is applied to advancing windings 54 through wires 74 and 75, as hereinbefore explained, in order to compensate for the voltage induced in control windings 34 and prevent such voltage from producing a current through output windings 36 and thus returning the transferred information to the previous core 30. The compensating voltage applied should be larger than the induced voltage across the control windings 34, and in such case rectifier 42 will prevent any backward flowing of information.

A similar compensating voltage supplied by resistor 78 is applied to control windings 32 when an advancing pulse is applied to advancing windings 52.

Any voltage source may be used instead of resistors 76 and 78, but such voltage sources should have low internal impedances at least during the transfer of information to a core, that is, when an advancing pulse is applied, for instance, to advancing windings 54 to advance the stored information from cores 31 to cores 30, the voltage source replacing resistor 78 should offer a low impedance to the advancing information pulse. Such a requirement of low impedance of voltage sources may be satisfied, for instance, by using separate pulse sources arranged to satisfy the above described time phase and low impedance requirements.

Though two previously described constructions of an information delay line are preferred, a similar line using three rather than two cores as a basic unit may be constructed as shown in Fig. 5. In this arrangement, compensating windings 90, 91 and 92 are used to prevent the backward flow of information. To transfer information stored in core 81 to core 82, an advancing pulse supplied by pulse generator 101 actuated by, for example, a three cycle ring circuit 100, to provide advancing pulses spaced in time in cyclic order to operate pulse generators 101, 102 and 103, said ring circuit being actuated by signal generator 110, is applied to advancing winding 94, thus inducing a voltage in output winding 88 which appears across control winding 86 of core 82, thus advancing the information as hereinbefore explained. At the same time, the advancing pulse is applied to compensating winding 90 of core 80. As long as the magnetising current force applied to the compensating winding 90 is greater than the magnetising current force in output winding 87 on core 80 supplied by control winding 85 on core 81, core 80 will remain in its state of negative residual magnetic flux density. Thus the transfer of information from core 81 to core 82 will not affect core 80, and the backward flow of information will be eliminated.

Figures 6, 7:
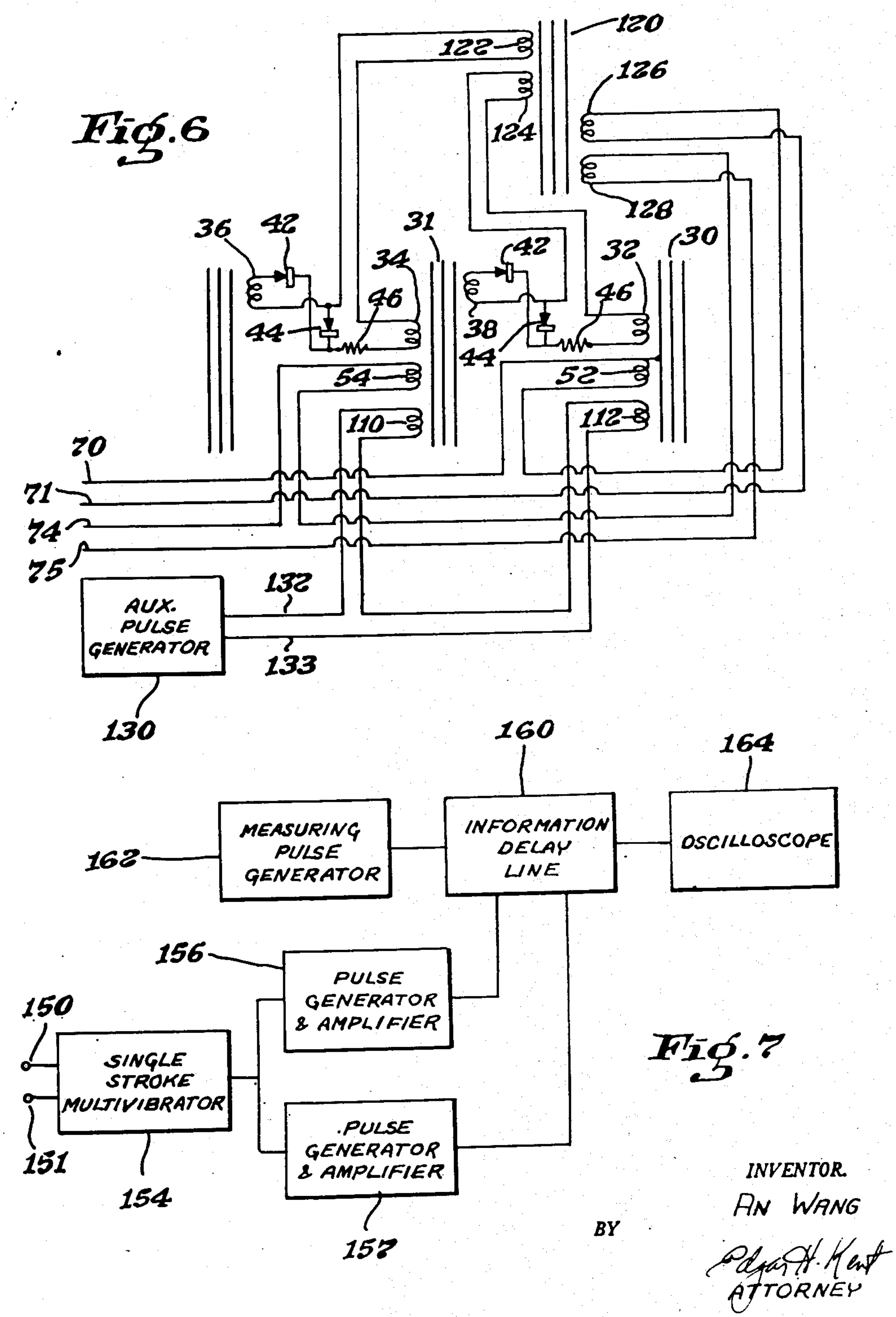
Fig. 6 illustrates an auxiliary circuit for use with the information delay line.
Fig. 7 illustrates the information delay line as used as a counter.

Referring to Fig. 6, by combining the various functions of the rectifiers and compensating windings an apparatus may be constructed which functions as an information delay line in which information is stored and stepped forward as advancing pulses are applied, and at the same time, by the use of an extra core and an extra pulse source, the information stored in any particular core can be read out without advancing the information along the information delay line.

The auxiliary core 120 is normally kept in a state of negative residual magnetic flux density. Since the flux of the core does not change, any winding on core 120 will thus appear as a short circuit, and the windings 122 and 124 on core 120 are thus essentially short circuits in series relation with output windings and control windings 34 interconnecting the cores. In normal operation, that is, in advancing an information pulse along the information delay line, alternate pulses are supplied to pulse windings 52 and 54 through wires 70 and 71, and 74 and 75, respectively, as hereinbefore described. When the first advancing pulse is applied to winding 54 on core 31, thus inducing a voltage across output winding 38 on core 31, the same pulse is simultaneously applied to winding 128 on core 120, thus keeping the magnetic flux of core 120 at the negative residual magnetic flux. Since windings 122 and 124 appear as short circuits when there is no change of flux in the core 120, the information will be advanced to core 30. Similarly, when the information is advanced from core 30, the pulse applied to advancing winding 52 will be applied to winding 126 and again prevent any flux change of core 120. Thus the information delay line consisting of cores 30 and 31 operates as if the auxiliary core 120 was not in the circuit.

Information stored in the information delay line may be read out by applying an auxiliary pulse generated by pulse generator 130 to auxiliary pulse windings 110 on core 31 and auxiliary pulse winding 112 on core 30. The application of the auxiliary pulse to auxiliary pulse winding 110 transfers the information from core 31 to auxiliary core 120, and the information is prevented from advancing to core 30 by the application of the auxiliary pulse to auxiliary winding 112 on said core 30. Said auxiliary pulse keeps the flux of core 30 in its state of negative magnetic flux, and control winding 32 on core 30 appears as a short circuit, thus the information is transferred from core 31 through output winding 38 to auxiliary core 120 through winding 124.

During such transfer, the state of residual magnetism of core 31 may be determined by measuring the voltage, for instance by an oscilloscope, across any of the windings on core 120, a large voltage showing a positive state of residual magnetism of core 31, and a small voltage a negative state of residual magnetism of core 31, as hereinbefore explained.

To return the information stored in core 120 to core 31, an advancing pulse is simultaneously applied to winding 52 on core 30 and to winding 126 on core 120. The current through winding 52 prevents any change of flux in core 30, and the pulse in winding 126 on core 120 induces a voltage in windings 122, thus inducing a voltage in winding 34 of core 31 and returning the information to core 31.

Advancing pulses may then be applied as previously explained to advance the information along the delay line.

Information delay lines as hereinbefore described are particularly useful as terminal storage between high and low speed lines, as information may be fed to or removed from said delay lines either by advancing the information along the entire line, or by removing it by a parallel arrangement of similar lines. For instance, as the terminal of a high speed information line, a number of delay lines constructed according to my invention may be arranged in series relation to receive the high speed information, and in parallel arrangement to operate lower speed devices, such as typewriters, by which the information is to be recorded.

Similarly, a high speed line may be operated by a number of low speed lines by storing the information in information delay lines arranged in parallel relationship, and then actuating the high speed line with such delay lines arranged in series relationship.

The information delay line of my invention may also be used as an impulse counter, since the number of pulses applied to the advancing windings on the cores making up the delay line determine the rate of advance of information in the line, that is, a pulse applied to the advancing winding of a core advances the information stored in that core to the next core. In any given delay line in which the number of cores is known, then, the number of advancing pulses may be determined by applying a measuring pulse to the control winding of the first core of the delay line, and by the later location of the information corresponding to such a measuring pulse, for instance by the use of the auxiliary core arrangement of Fig. 6, determine how many advancing pulses have been applied to advance it to that location, or preferably to the end of the line where it may be read out by the usual means. For instance, if a delay line is composed of ten cores, the application of ten advancing pulses will advance the measuring information from one end of the line to the other. Since alternate advancing pulses must be supplied to alternate cores in the delay line, the impulses to be counted may either be used to actuate a circuit which produces two pulses spaced in time that are applied to the advancing windings on alternate cores such as that of Fig. 3, thus counting five impulses by advancing the measuring information from one end of a ten core line to the other end or, by the use of a scale of two circuit as known to the art which, when actuated by the pulses to be counted, produces pulses at two separate outputs alternately to supply the two advancing pulses to the advancing windings on alternate cores, a delay line of ten cores may be used to count ten advancing pulses.

Referring to Fig. 7, the impulses to be counted, for instance, from a source such as a Geiger counter, are fed through terminals 150 and 151 to a single stroke multivibrator indicated generally at 154. Such devices are known to the art, and when actuated by a single impulse will produce two impulses spaced in time. The impulses so produced may be used to actuate pulse generators 156 and 157, which supply the advancing pulses to the information delay line such as that of Fig. 3, for instance, indicated generally at 160. A measuring pulse is supplied to the control winding of the first core of the information delay line 160 by pulse generating means 162. The arrival of information corresponding to such a measuring pulse at the end of the information delay line 160 as read out, for instance, by means of an oscilloscope 164, indicates the number of advancing pulses that have been counted as hereinbefore explained, and from the number of advancing pulses the number of pulses that have actuated the single stroke multi-vibrator will be known since the multivibrator produces two pulses when actuated by a single pulse. The number of impulses counted within a given period of time may be measured by a timing device, for instance, the timing device and the measuring pulse generator 162 being so interconnected that the arrival of measuring information at the end of the delay line will reset the pulse generator, thus resulting in a circuit that divides the number of actuating pulses by a number dependent on the number of cores in the information delay line. Further counters may also be actuated by the arrival of measuring information at the end of the delay line.

By the use of the delay line of my invention as a counter, an apparatus is provided which will count at high speed, since there are no mechanical limitations, and at the same time permit dividing the pulses by any convenient number, so that, for instance, a record may be produced in terms of the standard number system rather than the binary number system.

I claim:

1. A pulse transfer controlling device including a core of magnetic material having a generally rectangular hysteresis curve with substantially square knees, and in which the residual magnetic flux density is at least 0.8 of the saturation flux density, an input winding on said core, an output winding on said core, a control winding on said core, and pulse generator means connected to said control winding whereby said core may be set in a desired state of residual magnetic flux density.

2. An information delay line including at least two cores of magnetic material in which the residual magnetic flux density is a large fraction of the saturation flux density, a control winding on the first of said cores, an advancing winding on said first core operatively connected to one pulse generating means, an output winding on said first core operatively connected to a control winding on the second of said cores, an advancing winding on said second core operatively connected to a second pulse generating means, and an output winding on said second core, said connection including rectifying means in series relation with said connected windings.

3. An information delay line including at least two cores of magnetic material in which the residual magnetic flux density is a large fraction of the saturation flux density, a control winding on the first of said cores, an advancing winding on said first core operatively connected to one pulse generating means, an output winding on said first core operatively connected to a control winding on the second of said cores, an advancing winding on said second core operatively connected to a second pulse generating means, and an output winding on said second core, said pulse generating means being interconnected whereby the advancing winding on said first core and the advancing winding on said second core are supplied with pulses alternate in time.

4. A magnetic counter comprising an information delay line as claimed in claim 34, in which said pulse generating means are actuated by the pulses to be counted, and further pulse generating means applying a measuring pulse to said line.

5. An information delay line including at least two cores of magnetic material in which the residual magnetic flux density is a large fraction of the saturation flux density, a control winding on the first of said cores, an advancing winding on said first core operatively connected to one pulse generating means, an output winding on said first core operatively connected to a control winding on the second of said cores, an advancing winding on said second core operatively connected to a second pulse generating means, an output winding on said second core, said pulse generating means being interconnected whereby the advancing winding on said first core and the advancing winding on said second core are supplied with pulses alternate in time, auxiliary pulse windings on said cores operatively connected to auxiliary pulse generator means, a third core of magnetic material in which the residual magnetic flux density is a large fraction of the saturation flux density, a winding on said core in series connection with the control winding of said first core, a winding on said third core in series connection with the control winding of said second core, a winding on said third core operatively connected to one said pulse generating means, and a winding on said third core operatively connected to said second pulse generating means, whereby the information stored in said line may be read out and returned to said line without destroying said information.

6. An information delay line including at least two cores of magnetic material in which the residual magnetic flux density is a large fraction of the saturation flux density, a control winding on the first of said cores, an advancing winding on said first core operatively connected to one pulse generating means, an output winding on said first core operatively connected to a control winding on the second of said cores, said connection including rectifying means in series relation with said connected windings and rectifying means in parallel relation with said control winding on said second core, an advancing winding on said second core operatively connected to a second pulse generating means, and an output winding on said second core.

7. An information delay line including at least two cores of magnetic material in which the residual magnetic flux density is a large fraction of the saturation flux density, a control winding on the first of said cores, an advancing winding on said first core operatively connected to one pulse generating means, an output winding on said first core operatively connected to a control winding on the second of said cores, said connection including rectifying means in series relation with said connected windings and rectifying means in parallel relation with said control winding on said second core, an advancing winding on said second core operatively connected to a second pulse generating means, and an output winding on said second core, said pulse generating means being interconnected whereby the advancing winding on said first core and the advancing winding on said second core are supplied with pulses alternate in time.

8. A magnetic counter comprising an information delay line as claimed in claim 7, in which said pulse generating means are actuated by the pulses to be counted, and further pulse generating means applying a measuring pulse to said line.

9. An information delay line including at least two cores of magnetic material in which the residual magnetic flux density is a large fraction of the saturation flux density, a control winding on the first of said cores, an advancing winding on said first core operatively connected to one pulse generating means, an output winding on said first core operatively connected to a control winding on the second of said cores, said connection including rectifying means in series relation with said connected windings and a voltage source in series relation with said connected windings, an advancing winding on said second core operatively connected to a second pulse generating means, and an output winding on said second core.

10. An information delay line including at least two cores of magnetic material in which the residual magnetic flux density is a large fraction of the saturation flux density, a control winding on the first of said cores, an advancing winding on said first core operatively connected to one pulse generating means, an output winding on said first core operatively connected to a control winding on the second of said cores, said connection including rectifying means in series relation with said connected windings and a voltage source in series relation with said connected windings, an advancing winding on said second core operatively connected to a second pulse generating means, and an output winding on said second core, said pulse generating means being interconnected whereby the advancing winding on said first core and the advancing winding on said second core are supplied with pulses alternate in time.

11. A magnetic counter comprising an information delay line as claimed in claim 10, in which said pulse generating means are actuated by the pulses to be counted, and further pulse generating means applying a measuring pulse to said line.

12. A pulse transfer controlling device comprising a core of magnetic material in which the residual magnetic flux density is a large fraction of the saturation flux density, a control winding on said core, an output winding on said core, a compensating winding on said core operatively connected to one pulse generating means, and an advancing winding on said core operatively connected to a second pulse generating means, said pulse generator means being interconnected to supply pulses alternate in time to said compensating and said advancing windings respectively.

13. An information delay line comprising a series of pulse transfer controlling devices as claimed in claim 12.

14. An information delay line including at least three cores of magnetic material in which the residual magnetic flux density is a large fraction of the saturation flux density, control windings on said cores, output windings on said cores, the output winding on said first core being operatively connected to the control winding on said second core, and the output winding on said second core being operatively connected to the control winding on said third core, advancing windings on said cores, and compensating windings on said cores, the advancing winding on the second of said cores and the compensating winding on the first of said cores operatively connected to one pulse generating means, the advancing winding on the third of said cores and the compensating winding on the second of said cores operatively connected to a second pulse generating means, and the advancing winding on the first of said cores and the compensating winding on the third of said cores operatively connected to a third pulse generating means.

15. An information delay line including at least three cores of magnetic material in which the residual magnetic flux density is a large fraction of the saturation flux density, control windings on said cores, output windings on said cores, the output winding on said first core being operatively connected to the control winding on said second core, and the output winding on said second core being operatively connected to the control winding on said third core, advancing windings on said cores, and compensating windings on said cores, the advancing winding on the second of said cores and the compensating winding on the first of said cores operatively connected to one pulse generating means, the advancing winding on the third of said cores and the compensating winding on the second of said cores operatively connected to a second pulse generating means, and the advancing winding on the first of said cores and the compensating winding on the third of said cores operatively connected to a third pulse generating means, said pulse generating means being operatively interconnected to supply three advancing pulses in cyclic order.

16. A magnetic counter comprising an information delay line as claimed in claim 15 in which said pulse generating means are actuated by the pulses to be counted, and further pulse generating means applying a measuring pulse to said line.

17. An information delay line including three cores of magnetic material in which the residual magnetic flux density is a large fraction of the saturation flux density, control windings on said cores, output windings on said cores, the output winding on said first core being operatively connected to the control winding on said second core, and the output winding on said second core being operatively connected to the control winding on said third core, said connections including rectifying means in series relation with said connected windings, advancing windings on said cores, and compensating windings on said cores, the advancing winding on the second of said cores and the compensating winding on the first of said cores operatively connected to one pulse generating means, the advancing winding on the third of said cores and the compensating winding on the second of said cores operatively connected to a second pulse generating means, and the advancing winding on the first of said cores and the compensating winding on the third of said cores operatively connected to a third pulse generating means.

18. An information delay line including three cores of magnetic material in which the residual magnetic flux density is a large fraction of the saturation flux density, control windings on said cores, output windings on said cores, the output winding on said first core being operatively connected to the control winding on said second core, and the output winding on said second core being operatively connected to the control winding on said third core, said connections including rectifying means in series relation with said connected windings, advancing windings on said cores, and compensating windings on said cores, the advancing winding on the second of said cores and the compensating winding on the first of said cores operatively connected to one pulse generating means, the advancing winding on the third of said cores and the compensating winding on the second of said cores operatively connected to a second pulse generating means, and the advancing winding on the first of said cores and the compensating winding on the third of said cores operatively connected to a third pulse generating means, said pulse generating means being operatively interconnected.

19. A magnetic counter comprising an information delay line as claimed in claim 18 in which said pulse generating means are actuated by the pulses to be counted, and further pulse generating means applying a measuring pulse to said line.

20. A pulse transfer controlling device including a core of magnetic material in which the residual magnetic flux density is a large fraction of the saturation flux density, and a plurality of windings on said core, one of said windings having rectifying means in series connection therewith whereby said core may be set in a desired state of residual magnetic flux density by pulse generator means connected to another of said windings, and current flow through a load connected to said one winding will take place in but a single direction.

21. An informative delay line as claimed in claim 6 including means for applying a compensating voltage to the control winding on one of said cores when an advancing pulse is applied to the advancing winding on said other core.

22. A pulse transfer controlling device including a core of magnetic material in which the residual magnetic flux density is a large fraction of the saturation flux density, winding means on said core, including an output winding with rectifying means in series connection therewith to permit current flow in one direction only through said output winding, and current pulse generator means operatively connected to said winding means to apply a current pulse to said winding means to induce in said winding means a voltage controlled by the state of residual magnetic flux density of said core.

23. A pulse transfer controlling device including a core of magnetic material having a generally rectangular hysteresis curve with substantially square knees, and in which the residual magnetic flux density is at least 0.8 of the saturation flux density, winding means on said core, and current pulse generator means operatively connected to said winding means to apply a current pulse to said winding means to induce in said winding means a voltage controlled by the state of residual magnetic flux density of said core.

24. A pulse transfer controlling device including a core of magnetic material in which the residual magnetic flux density is a large fraction of the saturation flux density, winding means on said core, current pulse generator means operatively connected to said winding means to apply current pulses of opposite polarity to said winding means, said pulses of one polarity acting to saturate said core in one direction to read in information, and of the opposite polarity acting to read out said information by inducing voltage in said winding means as controlled by the state of residual magnetic flux density of said core and to reset said core.

25. A pulse transfer controlling device including a core of magnetic material in which the residual magnetic flux density is a large fraction of the saturation flux density, winding means on said core, current pulse generator means operatively connected to said winding means to apply control pulses of one polarity only and transfer pulses of opposite polarity only to said winding means, said control pulses acting to saturate said core in one direction to read in information, and said transfer pulses acting to read out said information by inducing voltage in said winding means as controlled by the state of residual magnetic flux density of said core and to simultaneously reset said core.

26. A pulse transfer controlling device including a core of magnetic material in which the residual magnetic flux density is a large fraction of the saturation flux density, and winding means on said core including an output winding having rectifying means in series connection therewith, whereby said core may be set in a desired state of residual magnetic flux density by pulse generator means connected to said winding means to apply a current pulse thereto, and current flow induced in said winding means by said current pulse will take place in but a single direction through a load connected to said winding means and rectifying means.

27. A pulse transfer controlling device including a core of magnetic material in which the residual magnetic flux density is at least 0.4 of the saturation flux density, and winding means on said core having rectifying means in series connection therewith, whereby said core may be set in a desired state of residual magnetic flux density by pulse generator means connected to said winding means to apply a current pulse thereto, and current flow induced in said winding means by said current pulse will take place in but a single direction through a load connected to said winding means and rectifying means.

28. A pulse transfer controlling device including a core of magnetic material in which the residual magnetic flux density is a large fraction of the saturation flux density, winding means on said core, pulse generator means operatively connected to said winding means, load means operatively connected to said winding means, and rectifying means in series connection with said winding means and said load means, whereby said core may be set in a desired state of residual magnetic flux density by said pulse generator means, and current flow induced in said winding means will take place in but a single direction through said load means.

29. An information delay line including a pulse transfer controlling device as claimed in claim 28 in which said load means is a core of magnetic material in which the residual magnetic flux density is a large fraction of the saturation flux density, said core having winding means thereon in series connection with said rectifying means.

30. A pulse transfer controlling device as claimed in claim 28 in which said pulse generator means provides control pulses of one polarity and transfer pulses of opposite polarity, said control pulses being adapted to read information into said core, and said transfer pulses to read information out of said core by providing current flow through said load in one direction and simultaneously resetting said core, said rectifying means preventing current flow through said load when a control pulse is applied to said winding means.

31. A pulse transfer controlling device in which the residual magnetic flux density is a large fraction of the saturation flux density, winding means on said core, control pulse generator means operatively connected to said winding means to provide control pulses of one polarity only to said winding means to read in information, and transfer pulse generator means operatively connected to said winding means to provide transfer pulses of opposite polarity only to read out information and to simultaneously reset said core.

32. An information delay line including at least two cores of magnetic material in which the residual magnetic flux density is a large fraction of the saturation flux density, winding means on said cores, rectifying means connecting said winding means on one of said cores with said winding means on another of said cores, and pulse generator means operatively connected to said winding means.

33. An information delay line including a least two cores of magnetic material in which the residual magnetic flux density is a large fraction of the saturation flux density, winding means on said cores, rectifying means connecting said winding means on one of said cores with said winding means on another of said cores, control pulse generator means operatively connected to said winding means on a first of said cores to provide pulses of one polarity to said first core, first advancing pulse generator means operatively connected to said first core to provide pulses of opposite polarity to said first core, and second advancing pulse generator means operatively connected to said winding means on a second of said cores.

34. An information delay line as claimed in claim 33 in which said first and second advancing pulse generator means supply said windings on said first and second cores with pulses alternate in time.

References Cited in the file of this patent

UNITED STATES PATENTS

| | | |
|---|---|---|
| 2,236,793 | Furber | Apr. 1, 1941 |
| 2,429,336 | Zuschlag | Oct. 21, 1947 |

OTHER REFERENCES

Publication: Progress Report (2) on the EDVAC; vol II, published June 30, 1946, Moore School of Electrical Engineering, University of Pennsylvania, Philadelphia, Pa., especially paragraph 4.1.12 etc., and Figs. 17*a*, *b*, and *c*.